United States Patent
Kalinsky

[11] Patent Number: 6,125,982
[45] Date of Patent: Oct. 3, 2000

[54] THREADING CLUTCH FOR A MULTI-SPINDLE MACHINE

[75] Inventor: Robert M. Kalinsky, Broadview Heights, Ohio

[73] Assignee: Logan Clutch Corporation, Westlake, Ohio

[21] Appl. No.: 09/325,246

[22] Filed: Jun. 3, 1999

Related U.S. Application Data

[60] Provisional application No. 60/088,632, Jun. 9, 1998.

[51] Int. Cl.$^7$ ............................................. F16D 25/10
[52] U.S. Cl. ................................. 192/87.15; 192/48.91; 192/87.18
[58] Field of Search ............................. 192/48.91, 87.11, 192/87.14, 87.15, 87.18, 87.19; 408/133, 140

[56] References Cited

U.S. PATENT DOCUMENTS

| | | | |
|---|---|---|---|
| 4,644,819 | 2/1987 | Zugel | 74/665 B |
| 5,480,270 | 1/1996 | Read | 408/140 |
| 5,730,037 | 3/1998 | Manning | 82/118 |
| 5,947,250 | 9/1999 | Kalinsky | 192/87.11 |

*Primary Examiner*—Richard M. Lorence
*Attorney, Agent, or Firm*—Ralph E. Jocke; Daniel D. Wasil

[57] ABSTRACT

A threading clutch apparatus 40 and method for a multi-spindle machine that is pneumatically actuated and electronically controlled. The threading clutch apparatus 40 shifts from a low speed side 48 to a high speed side 46 at a selected time interval. An electrical circuit 106 is in electrical communication with a limit switch 112 which is operatively connected to a threading tool. At a desired time in the machining process, limit switch 112 is tripped and electrically starts a count down timer 114,116 to energize solenoid valve 102 for selectively activating the high speed side 46 of the threading clutch apparatus 40. The threading clutch 40 allows varying static torque capacity with variable pressure control to eliminate clutch adjustment and electronically monitoring tap depth adjustment.

21 Claims, 4 Drawing Sheets

THREADING CLUTCH FOR A MULTI-SPINDLE MACHINE

CROSS REFERENCE TO RELATED APPLICATIONS

This application claims the benefit of U.S. Provisional Application 60/088,632 filed Jun. 9, 1998.

TECHNICAL FIELD

This invention relates in general to a clutch and control for a multi-spindle machine. Specifically, this invention relates to an improved threading clutch and control system for a multi-spindle machine that provides consistent and greater torque capacity even during a warmup period.

BACKGROUND ART

Multi-spindle machines, also referred to as multiple spindle machines, are known in the prior art. Multi-spindle machines are used to mass produce standardized types of components. A multi-spindle machine typically has several work stations at which machining operations are performed. A piece of raw stock, such as bar stock, enters the machine at a first station and as the machine indexes, various machining operations are performed. Once this station is indexed completely through the machine, a completed part is formed. The part is released, and the process is repeated for that station with a new piece of raw stock. An advantage of multi-spindle machines is that all stations in the machine are producing parts simultaneously, resulting in high production.

Multi-spindle machines typically have a large indexing or main drum with four, five, six or eight stations thereon. Each of the stations carries a work piece. In all but one of the stations, where a new piece of stock enters, a machining operation is performed. After each operation is completed, the drum is rotated so that each work piece moves sequentially through the location where the various operations are performed. The machining operations typically performed in a multi-spindle machine include milling, turning, and threading.

While multi-spindle machines are very efficient in terms of producing standardized parts at a high rate they also have drawbacks. The primary drawback associated with multi-spindle machines is that the entire machine operates off of a single main motor. The main motor through a series of interconnecting shafts and gears drives all of the devices within the machine. All of these devices perform their operations simultaneously during a low speed and a high speed operation. Multi-spindle machines typically include a timing shaft for the coordination of multiple machine operations and proper speed. The operator of the machine is still required to set up the cams operating off the timing shaft which can be a very time consuming activity.

There is always a risk that one of the mechanisms within the machine will malfunction. If such a malfunction should occur and not be detected by an operator in time to shut the machine off, the machine will continue with its next cycle. In many cases an attempt by the machine to index to its next position will cause severe damage. This is why it is common for a human operator to be required to closely monitor multi-spindle machines.

Another drawback associated with multi-spindle machines is that typically the machines must change from high to low speed and back again during the course of their operating cycle. High speed is typically used for times in the machine cycle when critical machining operations are not occurring. High speed operation is desirable when the stations are indexing or when the tools are moving toward or away from the work pieces. Low speed operation is used when the tools in the machine are forming the metal or performing work on the work pieces at a station. Any attempt to operate the machine in high speed when such forming work is being performed is likely to cause a problem or possibly jam the machine.

It is the responsibility of the operator or technician to set the points in the machine cycle where the machine makes its high speed and low speed shifts. Shifting from high to low speed too early may result in slower cycle times and production rates. The same result may occur if the shift from low to high speed is made too late. The fastest cycle time for multi-spindle machines has been about 0.8 seconds. Use of the embodiments of the present invention can reduce that time to about 0.6 seconds.

Co-pending U.S. patent application Ser. No. 08/871,019 titled Multi-Spindle Machine Retrofit System filed on Jun. 6, 1997 is directed to a control system for a multi-spindle machine. It is assigned to the Assignee of the present invention and hereby incorporated by reference. The system disclosed therein decreases the cycle time, minimizes wear on the drive train gears, and enables a more effective operation of the multi-spindle machine by providing a retrofit system which includes a brake clutch, a feed clutch, and a high speed clutch. These three clutches are incorporated into the drive train gear layout of the multi-spindle machine and are pneumatically actuated and electronically controlled.

Another patent application also assigned to the Assignee of the present invention was co-pending with the Provisional U.S. Patent Application from which this application claims priority. That application is titled Multi-Spindle Machine Control System, U.S. patent application Ser. No. 08/423,238 filed on Apr. 17, 1995, issued as U.S. Pat. No. 5,730,037 on Mar. 24, 1998 and its contents are hereby incorporated by reference. U.S. Pat. No. 5,730,037 describes a control system for a multi-spindle machine that increases productivity, minimizes down time, and enables the more effective operation and monitoring of production by providing a controller on each side of the multi-spindle machine. The controller provides an interface with an administrative work station as well as including a user interface with display and key pad. The controller is in communication with a number of sensors mounted on the machine. In the event of a failure or a fault condition, the sensors detecting such fault or failure operatively through the controller shut down the main motor to prevent further damage and at the same time display the cause of the malfunction.

Still another related application is titled Threading Clutch and describes a threading clutch with biasing means situated between the friction disks. It is application Ser. No. 08/992,773 and was filed on Dec. 17, 1997 and is also hereby incorporated by reference.

U.S. Pat. No. 4,644,819 describes a high-low speed drive system for multiple spindle machines employing selective engagement and disengagement of associated pneumatic operated disc clutches.

The ball type threading clutch is a mechanical threading clutch typically employed on a multi-spindle machine, for example a Davenport 5 Spindle Automatic Screw Machine Model B. The ball type threading clutch replaced the wedge type formerly employed in this application since the ball type threading clutch shifts much easier than the wedge type.

The ball type threading clutch requires the use of a torque wrench on the threading spindle. Each side of the clutch is mechanically adjusted to between about 20–25 foot pounds (ft. lbs.) when cold and a torque of about 35 foot pounds when warmed up. A specific problem with misadjustment of a threading clutch is a "bucking" which can strip the nylon gears of a Davenport Model B. Another problem with this type of mechanical threading clutch is that the torque capacity is not consistent during the warm up period. There is about a 10–15 foot pound differential in tap torque and an inconsistent tap depth. The tap depth adjustment requires a mechanical turnbuckle screw thread type adjustment. This "hit and miss" approach presents problems for the operators.

Thus, there exists a need for an improved threading clutch with a control system for a multi-spindle machine, and particularly those of a Davenport Model B construction, that eliminates the mechanical screw thread type clutch adjustment. Preferably, such an improved threading clutch would allow for torque adjustment pneumatically with the ability of varying the static torque capacity with the air pressure. Also, the improved threading clutch would achieve coarse tap depth adjustment by movement of an electrical trip switch device. The fine tap adjustment would be achieved electronically with a timer relay.

DISCLOSURE OF INVENTION

It is an object of the present invention to provide an improved threading clutch for a multi-spindle machine that is controlled pneumatically and electronically.

It is a further object of the present invention to provide an improved threading clutch with a pneumatically adjustable torque that is consistent even during the warmup period.

It is a further object of the present invention to provide an improved threading clutch that eliminates the need for manual clutch adjustment.

It is a further object of the present invention to provide an improved threading clutch that achieves coarse tap depth adjustment through the movement of an electrical trip switch.

It is a further object of the present invention to provide an improved threading clutch that achieves fine tap depth adjustment with the use of an adjusting timer relay.

It is a further object of the present invention to provide a time delay after de-energizing the low speed clutch and before energizing the high speed clutch.

It is a further object of the present invention to provide an improved threading clutch capable of being retrofit.

Further objects of the present invention will be made apparent following the Best Modes for Carrying Out Invention and the appended claims.

The foregoing objects of the present invention are accomplished with a threading clutch that is pneumatically actuated and electronically controlled to provide adjustable and consistent torque capacities. When the threading clutch is engaged in low speed, the tap depth is controlled electronically by a threading slide moving toward the work piece. When it is near the finish depth, an electronic switch is tripped. A timer counts down until the threading slide reaches the desired depth. Then a timer relay contact closes and the high speed threading clutch is energized. The threading spindle outraces the work spindle to retract the tool. Advantageously, the present invention does not require a manual clutch adjustment like the prior art device. The coarse tap depth adjustment is achieved with a moving electrical trip switch. By adjusting the timer relay, the fine tap depth adjustment is achieved. The preferred form of the invention includes use with a control system as described in U.S. Pat. No. 5,730,037 titled Multi-Spindle Machine Control System which is assigned to the Assignee of the present invention and its contents are incorporated herein by reference. In addition, the preferred form of the present invention is intended to be used in conjunction with the Multi-Spindle Machine High Speed/Low Speed System described in co-pending patent application Ser. No. 60/088,631 filed on Jun. 9, 1998.

In this manner, the present invention alone or preferably in conjunction with these other inventions optimizes the multi-spindle machine performance and lowers cycle times to increase production. As a result, the present invention reduces wear on the parts of the multi-spindle machine, provides variable and consistent torque capacity, and minimizes waste from a hit and miss approach of tap depth adjustment with the prior art device.

BEST MODES FOR CARRYING OUT INVENTION

Figure 1:
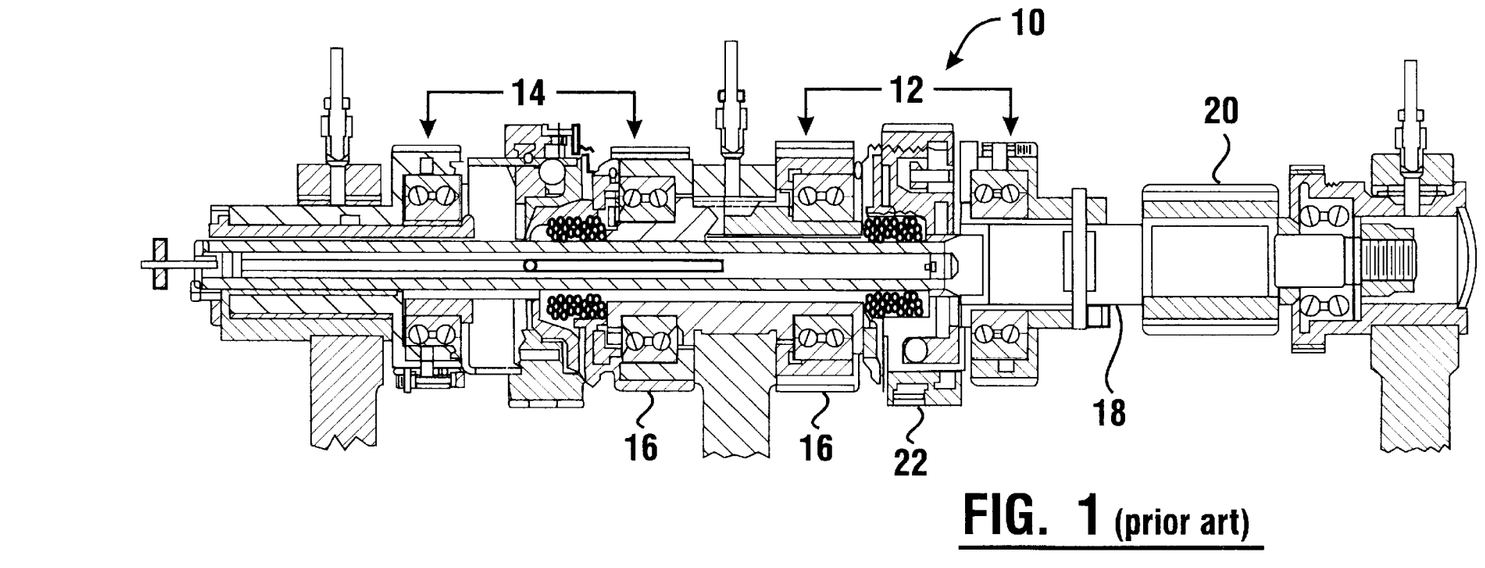
FIG. 1 is a sectional view of a prior art ball type threading clutch for a multi-spindle machine.

Referring now to the drawings where like numerals designate like or similar features throughout the several views, and first to FIG. 1, there is shown a sectional view of a ball type threading clutch generally designated 10. This mechanical type clutch is employed in a Davenport 5 Spindle Automatic Screw Machine Model B to which the present invention is particularly suited. However, it should be immediately apparent that the present invention is applicable to any multi-spindle machine. One side of the clutch is referred to as a high speed side 12 and the other side of the clutch is the low speed side 14. Both sides 12,14 are constructed when engaged to have gears with teeth 16 that mesh with counterpart gears that are interconnected through shafts to a high speed and a low speed drive train for engagement to perform work when the low speed clutch is selected as is known in the operation of a multi-spindle machine and to selectively use the high speed to withdraw tools and index to the next position.

Figure 2:
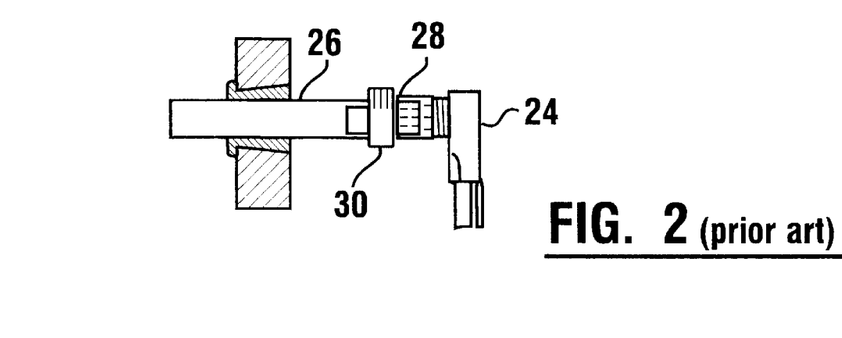
FIG. 2 is a sectional view of a threading spindle and a portion of a torque wrench illustrating a manual adjustment.

The ball type threading clutch 10 is mounted on a shaft 18 powered by the main motor (not shown) engaging the teeth 20 of a gear mounted thereon. Threading clutch 10 includes a mechanical screw thread 22 for clutch adjustment. One problem with the ball type threading clutch 10 is that the torque is not consistent during the warm up period. Because the ball type threading clutch shifts much easier than the prior art wedge type formerly used, it is absolutely necessary to use a torque wrench 24 on a threading spindle 26 when making an adjustment. A ¾ inch diameter plug 28 is held in the spindle 26 with a clamping collar 30. The plug has a hexagonal head to suit the torque wrench. The clutch is adjusted to read between about 20 to 25 foot pounds (ft. lbs.) when cold. When the clutch has been run and is warmed up, the torque is adjusted again to read about 35 foot pounds. Each side of the clutch requires adjustment and must be checked often during the running period. This 10 to 15 foot pound differential between the cold and warm-up interval can cause tap breakage and/or inconsistent tap depth. In addition, clutch adjustment can hinder the productivity of the multi-spindle machine not only due to the periodic checking required but the potential for waste due to the inconsistent tap depth. The tap depth adjustment requires a mechanical turnbuckle screw thread adjustment. This type of adjustment is a "hit and miss" approach.

In addition, connecting rods with adjustable turnbuckles that shift the threading clutches must also be kept properly adjusted to operate efficiently. Otherwise, improperly adjusted rods may seriously damage the clutches. Also misadjustment of the clutch can cause "bucking" by the machine, which can easily damage gears, particularly the nylon gears of a Davenport Machine.

As mentioned briefly earlier, the speed of the multi-spindle machine typically changes from a high speed to a low speed through the respective drive train and back again during the course of the operating cycle. The high speed is typically used for times in the machine cycle where critical machining operations are not occurring. High speed operation is desirable when the machines are indexing or when the tools are moving to or away from the work pieces that are not performing work thereon. The low speed operation is used when the tools and the machine are forming the metal. For example, a threading operation for bar stock is performed using a threading die which is driven via a worm gear. It is the worm gear that is driven through the threading clutch. The threading clutch acts to translate rotation from the reversible shaft to the threading shaft.

As noted earlier, there are several problems associated with the design and operation of the prior art mechanical type threading clutches such as the ball type threading clutch 10. One such problem is a lack of consistent torque during the warm up period. The torque capacity is a measure of the ability to translate the rotation of the shaft to drive cups to perform high speed and low speed operations.

Figure 3:
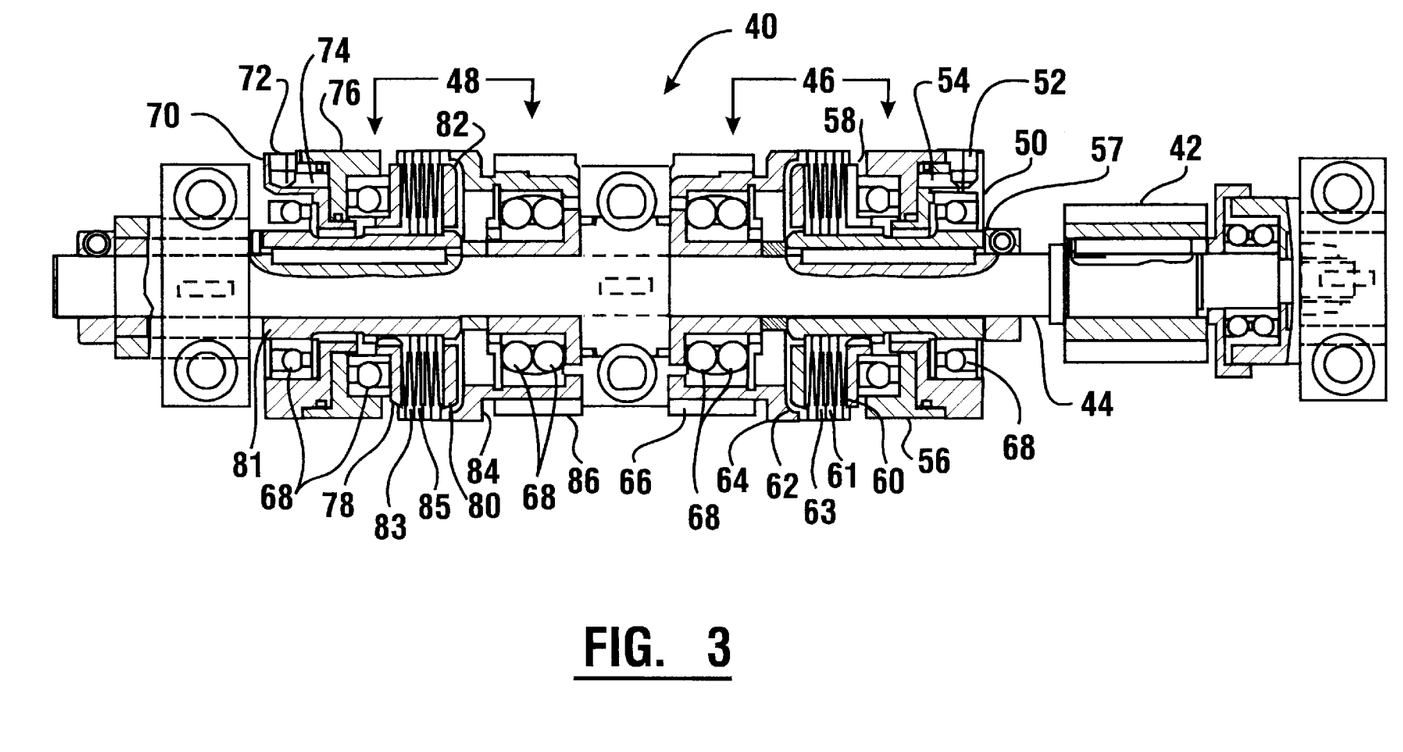
FIG. 3 is a sectional view of a threading clutch for a multi-spindle machine in accordance with the present invention.

Referring now to FIG. 3, there is shown the threading clutch apparatus 40 according to a preferred embodiment of the present invention. Threading clutch 40 is preferably constructed to replace or retrofit the prior art mechanical threading clutch apparatus 10 and is particularly suited for a Davenport Model B Multi-Spindle Machine. The threading clutch apparatus 40 is driven by gear 42 attached to shaft 44. The shaft 44 extends along in a longitudinal direction and can be rotated in either a first or a second direction at a first or second speed. The shaft 44 is operatively connected through a series of shafts and gears to and driven by a main motor (not shown) of the multi-spindle machine. The threading clutch apparatus 40 like the mechanical threading clutch apparatus 10 includes a high speed side 46 and a low speed side 48 similar to the high speed side 12 and low speed side 14 of the ball type threading clutch 10.

The high speed side 46 includes a generally cylindrical housing 50 with a first port 52 constructed to receive fluid from a fluid supply (not shown). A first fluid passage 54 provides fluid to a first piston 56 positioned proximate to the housing and in fluid communication with first port 52. First piston 56 is slidably positioned adjacent the housing and is constructed to force a first thrust member 58 against a plurality of first friction disks 60. The plurality of first friction disks 60 are interposed between the first thrust member 58 and the first back member 62. The first thrust member is preferably annular and is positioned on a hub 57 to translate the force of the first piston 56 to the plurality of the first friction disks 60 to compress the plurality of friction disks 60 so as to frictionally engage a drive cup 64 when the friction disks 60 are compressed. In this manner, the rotation of shaft 44 is translated through the compressed friction disks 60 to the drive cup 64, and to the teeth 66 on the high speed side 46 of the threading clutch apparatus 40. Bearings 68 are provided to allow for rotation relative to the fixed position of the housing 50 and the fixed position of the first piston 56.

Preferably, the plurality of friction disks 60 include a plurality of springs positioned in a space between the disks. The plurality of friction disks 60 preferably include an arrangement where a driving disk 61 is alternated with a driven disk 63 with a spring situated therebetween.

The low speed side 48 of the threading clutch apparatus 40 is similarly constructed to that of the high speed side 46. The low speed side 48 includes a generally cylindrical housing 70 with a second fluid port 72 positioned therein. A second fluid passage 74 is in fluid communication with a second piston 76. When pressurized fluid or compressed air is supplied to expand second piston 76, this forces a second thrust member 78 against a plurality of second friction disks 80 and against a second back member 82. When the plurality of friction disks 80 are compressed, the driving disks 83 frictionally engage the driven disks 85, which through a plurality of protruding areas engage the second drive cup 84 for translating rotation thereto with its teeth 86 engaging gears for a low speed operation. Bearings 68 are also provided on the low speed side 48 to allow the cylindrical housing 70 to remain generally stationary in a fixed position with the second piston 76.

The operation of the threading clutch apparatus 40 is initiated by the flow of pressurized fluid or compressed air selectively either to the high speed 46 or low speed 48 side of the threading clutch from a pressurized fluid or compressed air supply. Shaft 44 rotates freely within the threading clutch apparatus. The rotating shaft 44 also rotates an annular base member or hub 57,81 which is connected to the shaft 44, for example, by a key. On the high speed side 46 the annular base member or hub 57 has the first back member 62 fixed thereto. The first thrust member 58 is slidably mounted thereon and the plurality of friction disks 60 is interposed between first thrust member 58 and back member 62. Similarly, the low speed side 48 has a base member or hub 81 connected to the shaft 44 for rotation therewith. Hub 81 has the second back member 82 mounted thereon with the second thrust member 78 spaced therefrom and slidably movable thereon. The plurality of friction disks 80 are positioned therebetween.

The plurality of friction disks 60,80 include a plurality of driving disks 61,83 positioned between a plurality of driven disks 63,85. The structure and function of these disks are explained in detail in co-pending patent application Ser. No. 08/992,773 titled Threading Clutch filed on Dec. 17, 1997, which is assigned to the Assignee of the present invention, the disclosure and contents of which are hereby incorporated by reference. Each driving disk is positively driven by rotation of the hub on the shaft by means of a keyed area on its inner surface. This mating of the keyed area of the driving disk with the hub allows for the positive driving of each driving disk by the rotation of the hub on the shaft. Driven disks are positioned adjacent and between the driving disks. The inner surface of the driven disk is sized so that the driven disk does not engage any part of the driving hub. However, each driven disk includes a plurality of protruding areas that are engaged by a drive cup. The adjacent surfaces of the driving and driven disks are constructed to produce a high friction coefficient when the surfaces are engaged. Preferably, a plurality of springs are positioned in the space between each of the driven disks and the hub. Each spring acts to bias each adjacent driving disk away from the adjacent driven disk. When the plurality of friction disks are compressed by the thrust force of the piston, each of the springs are compressed by the adjacent driven disks and each driven disk is engaged by at least one driving disk. When each driving disk is so engaged, the rotation of the shaft is translated through each driven disk. When the thrust force of the piston is released, the springs act to expand the space between the adjacent driving disks allowing the driven disks to again rotate freely.

Figure 4:
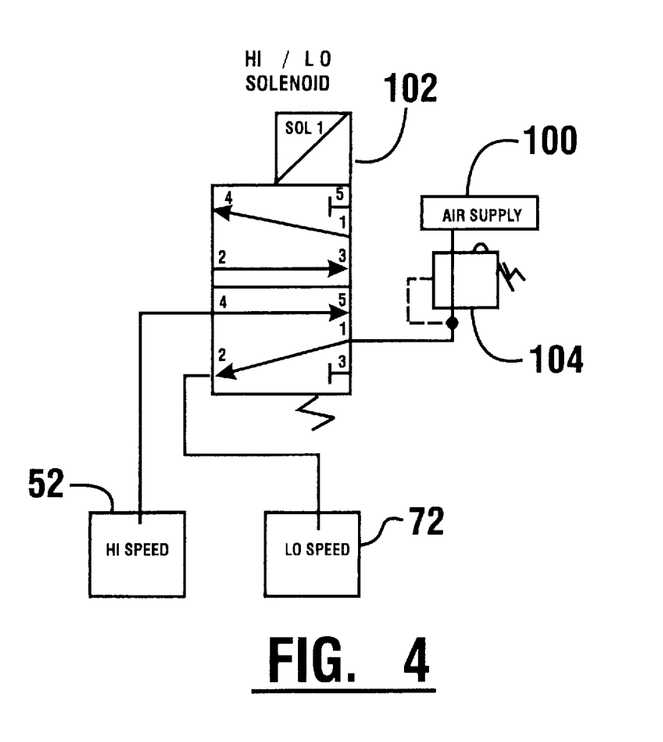
FIG. 4 is a schematic illustration of the solenoid valve employed in the present invention with the pneumatic flow paths indicated therein.

Referring next to FIG. 4, there is shown a schematic of the fluid circuit for pneumatically controlling the threading clutch apparatus 40 in accordance with the present invention. A high pressure fluid supply, such as a compressed air supply 100, is connected to a solenoid valve 102 which provides air selectively to engage the high speed or low speed side of the threading clutch. The schematic shown in FIG. 4 indicates an energized and a de-energized air flow condition for the four port solenoid valve 102. The de-energized or default position is shown in the lower portion square and the fluid flow path for the energized position is shown in the upper portion square of the solenoid valve 102. In the de-energized state, air is supplied from port one to port two where port two is linked through a conduit or high pressure line to second port 72 on the low speed side 48 of the threading clutch apparatus 40. In the energized state, the air supply is routed from port one through port four to the first port 52 on the high speed side 46 of threading clutch apparatus 40.

As defined earlier, torque capacity is a measure of the ability of the friction disks to translate the rotation of the shaft to the drive cups. The measure of torque capacity is that level at which the friction disks slip and fail to efficiently transfer the rotational power of the shaft. Advantageously air can be provided at various pressures through solenoid valve 102 and still have consistent torque capacity to the threading clutch apparatus 40. In the present invention, it has been determined that a pressure of 40 pounds per square inch (psi) can provide a torque capacity of 26 foot pounds (ft. lb.). A pressure of about 50 psi provides a torque capacity of about 37 foot pounds. A pressure of about 60 psi provides a torque capacity of about 48 foot pounds. A pressure of about 70 psi provides a torque capacity of about 59 foot pounds. A pressure of about 80 psi provides a torque capacity of about 70 foot pounds. A pressure of about 90 psi provides a torque capacity of about 81 foot pounds. A pressure of about 100 psi provides a torque capacity of about 92 foot pounds. The torque capacities achieved with the present invention are adjustable with pressure and are consistent whether the threading clutch apparatus is operated when cold or even when it is warmed up to its normal running temperature. An adjustable pressure control valve 104 that may be controlled either manually or automatically with a microprocessor or computer provides the ability to change torque capacity to suit a particular manufacturing requirement for any machining operation. The output of control valve 104 is preferably operatively connected to a gauge, indicator, sensor or other means which enables controlling the outlet pressure either manually or automatically.

Figure 5:
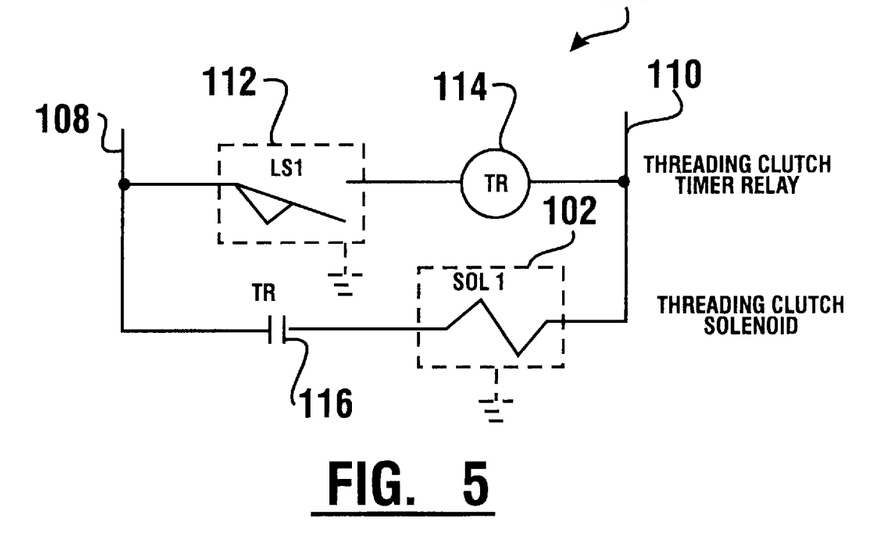
FIG. 5 is an electrical schematic for the threading clutch timer relay and solenoid according to the present invention.

Turning next to FIG. 5, there is shown an electrical schematic of circuit 106 for the operation of the preferred embodiment of the present invention. Circuit 106 is shown in the default position. All electrical connections are made between electrical power leads 108,110 which are preferably connected to the control system for the multi-spindle machine. A suitable control system is disclosed in U.S. Pat. No. 5,730,037 titled Multi-Spindle Machine Control System which is assigned to the Assignee of the present invention and is hereby incorporated by reference.

In the de-energized state of solenoid valve 102, air is supplied to the low speed side of the threading clutch apparatus through the second port 72. Initially, the threading clutch 40 is engaged in low speed. A threading slide, mechanically coupled to the threading clutch apparatus through the multi-spindle machine's interconnected shaft and gear layout of the low speed drive train, moves with the machining on a work piece as described in the previously referenced U.S. Pat. No. 5,730,037. A threading tool (not shown) is guided on the slide with a switch actuator attached to the threading tool. At a preselected position in the process, the switch actuator engages and trips limit switch 112. For illustrative purposes, the limit switch may be tripped when the threading tool is near the desired finish depth of the manufacturing process, for example in a threading process.

When limit switch 112 is tripped, timer relay circuit 114 counts down to a preset time that corresponds to a desired tap depth in the threading process. After the predetermined amount of time, timing relay 114 closes timing relay switch 116 which allows electricity to flow to solenoid valve 102, which becomes energized, and switches the flow path of the air supply to provide air to the first fluid port 52 and activate the high speed side 46 of the threading clutch apparatus 40. When the low speed side 48 no longer receives air through the second fluid port 72 the springs between the plurality of friction disks cause the friction disks 80 to disengage from the second drive cup 84. When the high speed side 46 of the threading clutch apparatus 40 is engaged, the threading spindle (not shown) outraces the work spindle (not shown) which retracts the tool from the threading process. As is known in this art, a running clutch is employed to facilitate the change from the low speed to the high speed.

From the foregoing, the threading clutch apparatus 40 of the present invention allows a coarse tap depth adjustment to be achieved by simply moving the electrical switch trip 112 which can include the use of a cam on a timing shaft. A fine tap depth adjustment is achievable by adjusting the timer relay 114. As an example, a 0.01 second timer adjustment for a 32 pitch thread would provide half turn gauge control.

Figure 6:
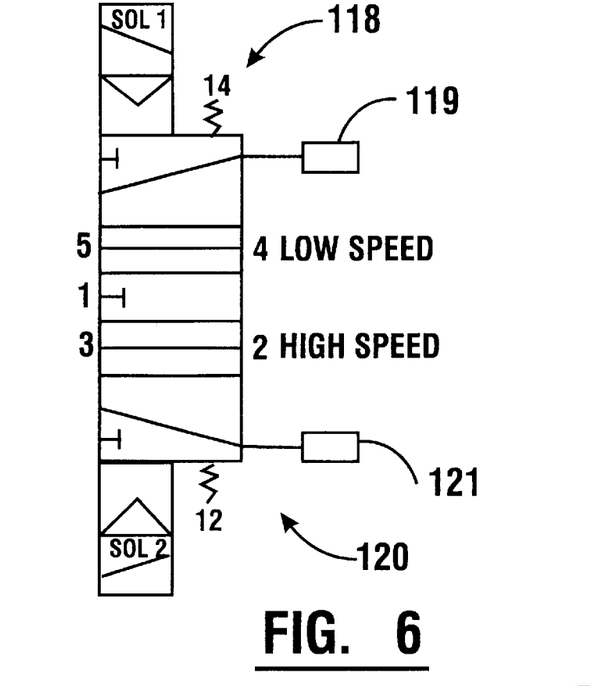
FIG. 6 is a schematic illustration of a low speed solenoid valve and a high speed solenoid valve employed in an alternative embodiment of the present invention with the pneumatic flow paths indicated thereon.

Referring next to FIG. 6, there is shown a schematic of the fluid circuit for pneumatically controlling the threading clutch apparatus in accordance with an alternative embodiment of the present invention.

In this alternative embodiment an air supply (not shown) is connected to a solenoid valve 118 for the low speed side 48 of the threading clutch apparatus and a solenoid valve 120 for the high speed side 46 of the threading clutch apparatus. The schematic shown in FIG. 6 indicates an energized and a de-energized air flow condition for solenoid valves 118, 120. The de-energized or default position is shown in the center portion square and the fluid path for the energized position is shown in the upper portion square for solenoid valve 118 and in the lower portion square for solenoid valve 120. Either solenoid valve 118 or solenoid valve 120 may be energized at any time, but not both. Both may be de-energized at the same time, as will be described later.

In the energized state of solenoid valve 118 air is supplied through a conduit or high pressure line and a low speed side flow control 119 to second port 72 on the low speed side 48 of the threading clutch apparatus 40. In the energized state of solenoid valve 120 air is supplied through a conduit or high pressure line and a high speed side flow control 121 to first port 52 on the high speed side 46 of the threading clutch apparatus 40. Flow controls 119, 121 provide metered flow for more uniform and controlled machine operation.

Air can be provided at various pressures and an adjustable pressure control valve 104 may also be used as described above.

Figure 7:
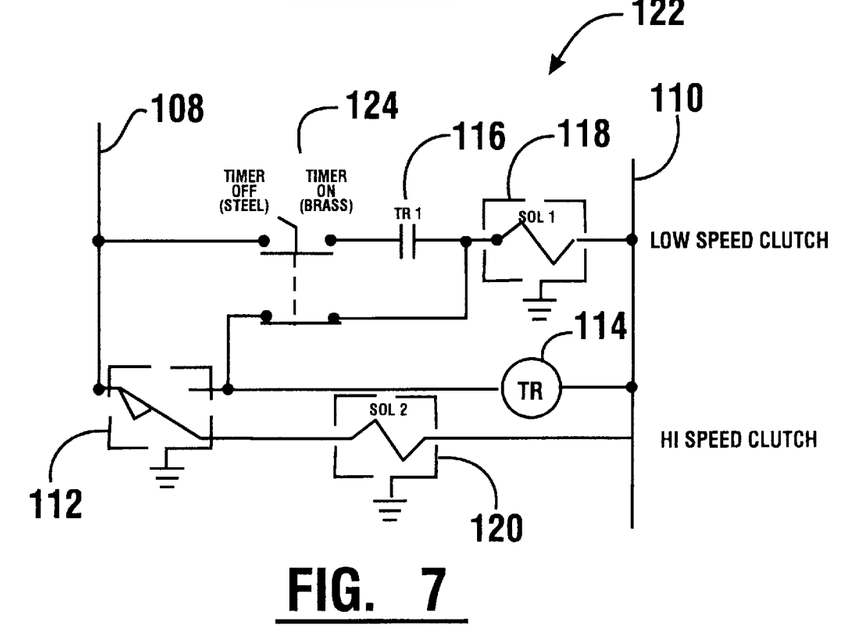
FIG. 7 is an electrical schematic for the threading clutch timer relay, solenoids and delay timer of an alternative embodiment of the present invention.

Turning next to FIG. 7, there is shown an electrical schematic of circuit 122 for the operation of this alternative embodiment of the present invention. Circuit 122 is shown in the default position. All electrical connections are made between electrical power leads 108, 110 as previously described for circuit 106.

In the energized state of solenoid valve 120, air is supplied to the high speed side of the threading clutch apparatus through first port 52 and the threading clutch 40 is engaged in high speed. At a preselected position in the process, a switch actuator engages and trips limit switch 112. Solenoid valve 118 is energized and air is supplied to the low speed side of the threading clutch through second port 72. The machining process proceeds as described previously until a switch actuator engages and trips limit switch 112.

When limit switch 112 is tripped at this point in the manufacturing process, timer relay 114 counts down to a preset time that corresponds to a desired tap depth in the threading process. After a predetermined amount of time timing relay 114 closes timing relay switch 116 which allows electricity to flow to delay timer 124. At this time both solenoid valves 118, 120 are de-energized. After approximately 0.1 second delay timer 124 allows electricity to flow to solenoid valve 120, which becomes energized and switches the flow path of the air supply to provide air to first fluid port 52 and activate the high speed side 46 of the threading clutch apparatus.

Using flow controls 119, 121 and the approximately 0.1 second time delay from delay timer 124 avoids "bucking" by the machine, which can damage gears and other machine components. Davenport machines particularly have nylon gears which strip if the machine bucks. Of course it can be seen that flow controls and a delay time can be used with the first preferred embodiment described above.

When the high speed side 46 is activated, the low speed side 48 is not receiving air through second fluid port 72 and the springs between the plurality of friction disks cause the friction disks 80 to disengage from the second drive cup 84. When the high speed side 46 of the threading clutch apparatus 40 is engaged, the threading spindle (not shown) outraces the work spindle (not shown) which retracts the tool from the threading process. As is known in this art, a running clutch is employed to facilitate the change from the low speed to the high speed.

Preferably, the limit switch 112 is an Omron limit switch, Model Number D4CC2024 with LED indicator. Alternatively, the limit switch 112 can be replaced by an encoder as described in U.S. Pat. No. 5,730,037 filed on Apr. 17, 1995, the content of which is incorporated herein by reference. In the preferred embodiment of the invention, the timer is an Omron Model H3CA solid state timer. The timer contains a thumb wheel switch which allows the selection of a desired time unit and a desired time to count down.

Even though the electrical schematic 106 for the present invention is shown as a wiring diagram control circuit, it can alternatively be comprised of solid state components.

The operation of the apparatus of the present invention enables a high to low speed shift to be accomplished rapidly and accurately. The present invention eliminates the torque inconsistencies with the prior art as well as eliminating clutch adjustments. The static torque capacity is readily adjustable with control of the pressure supplied to either the high speed or low speed sides of the threading clutch assembly.

It is to be understood that while the foregoing description of the threading clutch apparatus according to the present invention may be a retrofit system particularly suited for a Davenport Model B 5 Spindle Automatic Screw Machine, the present invention may be applied with any multi-spindle machine as a new construction or as a retrofit.

Thus, the present invention achieves the above-stated objectives, eliminates difficulties encountered with the use of the prior art devices and systems, solves problems and attains the desirable results described herein.

In the foregoing description, certain terms have been used for brevity, clarity, and understanding. However, no unnecessary limitations are to be implied therefrom, because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principals of the invention, the manner in which it is constructed and operated, and the advantages and useful results attained; the new and useful structures, devices, elements, arrangements, parts, combinations, systems, equipment, operations and relationships are set forth in the appended claims.

I claim:

1. A threading clutch apparatus for a manufacturing operation of a multiple spindle machine, the apparatus comprising:

a shaft operable to rotate in either a first or second direction;

a first and a second hub, each of the hubs extending in a generally annular orientation with the shaft and in a generally surrounding relation and in operative connection with the shaft;

a first housing in generally surrounding relation with the first hub and mounted to remain in relatively fixed relation with the first hub, the first housing having at least one port for receiving a fluid;

a second housing in generally surrounding relation with the second hub and mounted to remain in relatively fixed relation with the second hub, the second housing having at least one port for receiving a fluid;

a first piston positioned proximate to the first housing and in fluid communication therewith, and operable to expand and contract responsive to a flow of fluid from the first housing;

a second piston positioned proximate to the second housing and in fluid communication therewith, and operable to expand and contract responsive to a flow of fluid from the first housing;

a plurality of first friction disks radially extending about the first hub, the first friction disks each including driving disks and driven disks wherein each driving disk is separated from a driven disk by means for biasing one disk from the other, the plurality of first friction disks being compressed when the first piston is in an expanded position, the compressed first friction disks operatively engaging a first drive cup;

a plurality of second friction disks radially extending about the second hub, the friction disks each including driving disks and driven disks wherein each driving disk is separated from a driven disk by means for biasing one disk from the other, the plurality of first friction disks being compressed when the second piston is in an expanded position, the compressed second friction disks operatively engaging a second drive cup;

a first gear in engaged relation with the first drive cup and a second gear in engaged relation with the second drive cup, wherein the first gear has a speed different from the second gear;

a threading tool position indicator device adapted to initiate a selected time interval; and a controller for selectively determining a desired speed from the first and second speed and for engaging the selectively determined speed, wherein the controller is operatively responsive to engage the selectively determined speed after the selected time interval.

2. The apparatus of claim 1 wherein the controller engages the selected speed by causing fluid to be received in either the first housing or second housing, wherein when fluid is received in the first housing the first piston expands, thereby compressing the first friction disks to operatively engage the first drive cup and thereby engage the first gear, and when fluid is received in the second housing the second piston expands, thereby compressing the second friction disks to operatively engage the second drive cup and thereby engage the second gear.

3. The apparatus of claim 2 wherein the controller comprises a fluid circuit with at to least one solenoid valve.

4. The apparatus of claim 3 wherein the fluid is compressed air.

5. The apparatus of claim 4 wherein the compressed air is supplied at a selected one of a plurality of pressures.

6. The apparatus of claim 5 wherein threading clutch torque capacity is selectively provided by compressed air at a selected one of a plurality of pressures.

7. The apparatus of claim 6 wherein air pressure is selectively supplied through an adjustable pressure control valve.

8. The apparatus of claim 7 wherein the pressure control valve is manually controlled.

9. The apparatus of claim 7 wherein the pressure control valve is automatically controlled.

10. The apparatus of claim 9 wherein the pressure control valve is automatically controlled by a microprocessor.

11. The apparatus of claim 1 wherein the valve arrangement comprises a single solenoid valve.

12. The apparatus of claim 1 wherein a timer is in communication with the controller, wherein the timer determines the selected time interval, and wherein the controller determines the desired speed responsive to a signal from the timer.

13. The apparatus of claim 12 wherein the threading tool position indicator device comprises a limit switch, wherein the limit switch is actuated selectively during the manufacturing operation to actuate the timer to communicate the signal to the controller.

14. The apparatus of claim 13 wherein the timer delays communicating the signal to the controller.

15. The apparatus of claim 12 wherein the threading tool position indicator device comprises an encoder, wherein the encoder is in operative connection with the controller.

16. A method for providing consistent static torque in a multiple spindle machine, comprising:

providing a threading clutch apparatus having a high speed side and a low speed side each selectively engageable with fluid means;

providing a first fluid port in fluid communication with the high speed side of the threading clutch apparatus;

providing a second fluid port in fluid communication with the low speed side of the threading clutch apparatus;

connecting a solenoid valve to the first and second fluid ports, the solenoid valve having a de-energized state of the solenoid wherein the low speed side of the threading clutch apparatus receives fluid in the second fluid port for activating a low speed drive train, the solenoid valve further having an energized state for activating the high speed side of the threading clutch by providing fluid thereto while no longer providing fluid to the low speed side of the threading clutch; and energizing the solenoid valve at a selected time to start the fluid flow to the first fluid port while stopping fluid flow to the second fluid port for switching the threading clutch apparatus to engage the high speed from the low speed.

17. The method of claim 16 wherein the fluid is compressed air.

18. The method of claim 17 wherein the compressed air is supplied at selected pressures.

19. The method of claim 16 wherein the selected time is determined by a timer.

20. In a multiple spindle machine comprising a threading clutch apparatus, a threading slide, and a control system for the threading clutch apparatus, wherein the threading clutch apparatus has a first fluid port and a second fluid port, and wherein the threading clutch apparatus has a first speed side and a second speed side and is rotatable at a first speed and at a second speed;

wherein the control system includes a valve arrangement for selectively directing a fluid to a desired fluid port on the threading clutch apparatus, the valve arrangement being in operative connection with the first fluid port which selectively actuates the threading clutch apparatus to engage in the first speed, the valve arrangement further being in operative connection with the second fluid port which selectively actuates the threading clutch apparatus to engage in the second speed;

a switch positioned adjacent the threading slide for engagement at a selected distance as the threading slide moves toward a work piece; and a timer in communication with the switch for permitting actuation of the valve arrangement after a selected time interval for causing the valve arrangement to selectively direct the flow of fluid, wherein actuation of the timer is operatively related to engagement of the switch.

21. Apparatus for performing a threading operation in a multiple spindle machine, the apparatus comprising:

a threading clutch having a high speed side and a low speed side, wherein the high speed side is adapted to enable a faster operation than the low speed side, wherein the high speed side is selectively changeable between an energized and a de-energized state, and wherein the low speed side is selectively changeable between an energized and a de-energized state;

a delay timer in operative relation with the high speed side and the low speed side, wherein the delay timer is operatively responsive upon actuation to delay energization of the high speed side for a selected time interval, and wherein the delay timer is actuated upon a de-energization of the low speed side.

* * * * *